United States Patent [19]
Schmidt et al.

[11] Patent Number: 5,590,387
[45] Date of Patent: Dec. 31, 1996

[54] METHOD FOR PRODUCING METAL AND CERAMIC SINTERED BODIES AND COATINGS

[75] Inventors: Helmut Schmidt, Saarbrücken; Rüdiger Nass, Riegelsberg; Mesut Aslan, Pirmasens; Sener Albayrak; Ertugrul Arpac, both of Saarbrücken; Theo König, Laufenburg-Rotzel; Dietmar Fister, Murg, all of Germany

[73] Assignee: H. C. Starck, GmbH & Co, KG, Goslar, Germany

[21] Appl. No.: 321,416

[22] Filed: Oct. 11, 1994

[30] Foreign Application Priority Data

Oct. 27, 1993 [DE] Germany .................. 43 36 694.5

[51] Int. Cl.⁶ ................................... B22F 7/02
[52] U.S. Cl. ................................ 419/36; 419/38
[58] Field of Search ............................. 419/36, 38

[56] References Cited

U.S. PATENT DOCUMENTS

| | | | |
|---|---|---|---|
| 3,120,698 | 2/1964 | Elliott | 29/182.5 |
| 3,351,464 | 11/1967 | Bodincseuits | 75/212 |
| 3,410,684 | 11/1968 | Printz | 75/214 |
| 3,539,472 | 11/1970 | Findeisen et al. | 252/51.5 |
| 3,653,883 | 4/1972 | Month et al. | 75/212 |
| 3,658,517 | 4/1972 | Davies et al. | 75/200 |
| 5,000,781 | 3/1991 | Skinner et al. | 75/249 |
| 5,112,388 | 5/1992 | Schulz et al. | 75/255 |
| 5,147,446 | 9/1992 | Pechenik et al. | 75/230 |
| 5,338,714 | 8/1994 | Rousset et al. | 501/127 |
| 5,490,968 | 2/1996 | Polizzotti et al. | 419/2 |

FOREIGN PATENT DOCUMENTS

| | | | |
|---|---|---|---|
| 4212633A1 | 2/1983 | Germany | C04B 35/00 |
| WO90/03838 | 4/1990 | WIPO | B01F 17/16 |

OTHER PUBLICATIONS

Patent Abstracts of Japan, JP-A-1 111 774 (NHK Spring Co. Ltd.), Apr. 1989, Nakatani Masahiko, class CO4B35/56. the related Japanese patent (in Japanese).

copy of European Patent Office Search Report Application Number EP 94 11 6229, dated 18 Aug. 1995.

*Primary Examiner*—Charles T. Jordan
*Assistant Examiner*—Daniel Jenkins
*Attorney, Agent, or Firm*—Jerry Cohen

[57] ABSTRACT

Metal and ceramic sintered bodies and coatings are produced using a combination of:

(a) nanocrystalline metal or ceramic powder wherein less than 1% of the individual particles have a deviation of more than 40%, and no individual particles have a deviation of more than 60%, from the average grain size, and (b) at least one low molecular-weight organic compound having at least one functional group that can react and/or interact with groups present on the surface of the powder particles, the materials (a) and (b) being dispersed in water and/or a polar organic solvent as dispersion medium.

35 Claims, No Drawings

METHOD FOR PRODUCING METAL AND CERAMIC SINTERED BODIES AND COATINGS

BACKGROUND OF THE INVENTION

The present invention provides a method for producing sintered bodies or coatings from metal or ceramic powder, using a suspension of surface-modified nanoscale metal or ceramic particles.

"Nanoscale particles" are hereinafter to be understood to mean particles (including powders), whose average size is not more than 10 nm, in particular not more than 50 nm and particularly preferably not more than 30 nm. "Nanodisperse materials" are nanoscale particles dispersed in a cartier medium which can be a binder and may include dispersion aids.

In the processing of nanodisperse materials there are essentially two problems, namely (a) the regulation of particle agglomeration in the processing of these materials and (b) the production of processable ceramic materials with high solids contents.

Regarding problem (a), it is evident that, in the transition from submicron to nanoscale powders, an increase in agglomeration is generally observed. This can be attributed to the fact that, with decreasing particle size, weak forces of interaction, for example van der Waals forces, also gain considerably in importance, or even com to predominate. In addition, there is the fact that the particle surface is always occupied by functional groups, that is to say groups capable of undergoing condensation. In conventional submicron powders, these groups are only of significance to the extent that they can be used as centers of interaction for necessary organic processing aids (dispersion aids, binders etc.). Because of the large surface-area-to-volume ratio of nanodisperse materials, however, the surface groups also take on great importance from another point of view. On the one hand they similarly serve as reaction centers for organic processing aids. On the other hand, however, they can also lead to the formation of hard agglomerates as a result of condensation reactions taking place between individual particles. The particles are then joined to one another by, so to speak, sinter bridges. It is therefore desirable to develop methods with which the agglomeration can be controlled in such a manner that powders agglomerated in a regulated manner can be obtained. Furthermore, it would be desirable if, with this method, the reactive surface could be outwardly shielded, and interparticle condensation thus be prevented.

Regarding the aforementioned problem (b), it is notable that the production of ceramic compounds with high solids contents and processing properties matched to a shaping process poses serious difficulties. To avoid agglomerated material, which may lead to severe defects in both green and sintered bodies, the materials are generally used in suspensions. For suspension stabilization, dispersion aids are generally added, which have the function of preventing agglomeration and providing the suspension with the necessary processing properties. For suspension stabilization, two principal procedures can generally be distinguished, namely electrostatic and stabilization and steric stabilization.

Electrostatic stabilization has the disadvantage that, by virtue of the relative large hydrodynamic radius of the suspended nanoscale particles, only small solids contents are feasible. Steric stabilization, by contrast, provides the possibility, in principle, of producing suspensions with high solids contents from nanoscale materials, since in this case the hydrodynamic particle radius is much smaller.

The advantage of steric stabilization have already been indicated with reference to the example of $SiO_2$. In this case, for the dispersion aid, nonionic organic polymers (e.g. polymethylmethacrylate) were generally used, which are adsorbed on the particle surface. The disadvantage of this kind of stabilization is that in this case, too, maximum solids contents of approx. 20 to 30 vol.-% are generally only feasible, and it is only possible to apply it to materials systems different from $SiO_2$ with considerable restrictions. This is in particular because the surfacechemical properties (e.g. acid/basic properties) specific to a material usually cannot be taken into account.

It is therefore desirable to provide a method with which it is possible to modify the particle surface by means of suitable chemical compounds such that an optimum degree of dispersion is achieved and high solids contents of the dispersion are feasible.

For example, titanium nitride (TIN) falls within the group of metallic hard materials and has a cubic crystalline structure. Because of the high proportion of covalent bonding, TiN has a high melting point, a high hardness and good oxidation resistance and corrosion resistance. These properties are the reason the for applications of TiN as coating materials for wear protection on metals and as one of the components in multiphase ceramics, for example $Al_2O_3$/TiN or $Si_3N_4$/TiN.

Pure TiN coatings or TiN coatings with admixtures of TiC are today produced via gas-phase processes. These include the CVD (chemical vapour deposition) and PVD (physical vapour deposition) processes. Corresponding apparatus is commercially available and a component of industrial production processes. These coatings are used in the following fields:

wear protection of metals in abrasive and tribological applications, on cutting, drilling and milling tools for increasing the machining capacity, as corrosion protection coatings in chemical reactors, as a coating of watch cases and jewellery.

A disadvantage of the TiN coatings produced by, for example, CVD and PVD is the inadequate adhesion to the substrates, so that the coatings often flake off and tools coated therewith become prematurely unusable. Substrates that can be used are metals with high heat resistance, hard metals, for example WC/Co, or else ceramic inserts.

Another application of nanocrystalline (nanoscale crystalline), ceramic powders such as TiN, TiC, SiC is their use in composite ceramics, for example $Al_2O_3$/TiC or $Si_3N_4$/TiN. The addition of such powders to the matrix materials can improve their mechanical properties, for example hardness, toughness or compressive strength. In a similar manner, the mechanical properties of bulk ceramics and metallic materials produced by powder metallurgical methods can be considerably improved by the application of nanocrystalline powders.

For example, by virtue of its high covalent bonding characteristic, pure TiN has only a very low sinter activity. Compaction therefore normally requires the use of sintering additives. In the simplest case this may be $TiO_2$ which is formed on the TiN surface in air in the presence of water. For example, it has been reported that TiN powder with an average grain size of 0.1 μm can be sintered without pressure at temperatures of about 1500° C. up to relative densities of 95%. This sintering behaviour is ascribed to the activation of the diffusion mechanisms leading to compaction by the break up ot $TiO_2$ localized on the TiN particle surface. Various publications deal with the sintering of TiN under pressure and/or in the presence of sintering additives. Thus, the hot pressing of TiN powders with a $ds_{50}$ value of 1 μm at temperatures up to 2100° C. and a sintering pressure of 14 MPa only leads to a density of 93% of the theoretical density of TiN; see M. Morijama et at., "Mechanical and Electrical Properties of Hot-Pressed TiN-Ceramics without Additives", J. Jap. Ceram. Soc., 22 (1991), pages 275–281. In M. Morijama et al., "The Mechanical Properties of Hot-Pressed TiN Ceramics with Various Additives", J, Jap. Ceram. Soc., 101 (1993), pages 271–276, the compaction behaviour of TiN in the presence of sintering additives during hot pressing is described. Specimens with a total of 10 wt.-% of $Al_2O_3$, $Y_2O_3$ and $B_4C$ produce, after hot pressing at 1950° C. and 14 MPa, densities of around 97 % of the theoretical. Furthermore, a 95% compaction by hot pressing at 1800° C. and 5.0 GPa has been reported.

The object of the present invention is to provide a method for producing metal and ceramic sintered bodies and coatings, which makes possible a regulation of the particle agglomeration and sufficiently high solids contents of the particle suspension used and can be carried out at relatively low sintering temperatures.

SUMMARY OF THE INVENTION

This object is achieved according to the invention by a method for producing metal and ceramic sintered bodies or coatings, which is characterized in that nanocrystalline metal or ceramic powder wherein less than 1% of the individual particles have a deviation of more than 40%, and no individual particles have a deviation of more than 60%, form the average grain size is, in the presence of at least one low molecular weight organic compound having at least one functional group that can react and/or interact with groups present on the surface of the powder particles, dispersed in water and/or a polar organic solvent as dispersion medium, the dispersion medium is removed and the surface-modified metal or ceramic powder, which, before or after the removal of the dispersion medium, has been processed to form green bodies or coatings, is sintered.

The method according to the invention makes it possible to regulate the agglomeration of nanoscale metal and ceramic powders, as a result of which dispersions of such particles with high solids contents can be produced in a satisfactory manner.

Starting materials suitable for the method according to the invention are in particular nanocrystalline metal and ceramic powders with a primary particle size of preferably less than 100 nm. This powder is supplied in a highly agglomerated state. Particularly preferred metal and ceramic powders are disclosed in the German patent applications P 42 14 719.0, P 42 14 722.0, P 42 14 729.9, P 42 14 724.7 and P 42 14 725.5. They are obtainable by the CVR method, as ensues from the process described in German patent application P 42 14 719.0, in a CVR apparatus, which is provided in the German patent application P 42 14 725.5. The content of these patent applications is completely incorporated in the present application by reference. Corresponding texts are provided as appendices A (719.0), B (122.0), C (724.7), D (725.5), E (729.9) herewith (in German).

German patent application P 42 14 719.0 (U.S. application Ser. No. 08/050,590) discloses a method for producing fine-particulate metal and/or ceramic powder by the reaction of corresponding metal compounds and corresponding coreactants in the gas phase—CRV—, the metal compound(s) and the further coreactants being caused to react in a reactor in the gaseous phase, condensed out homogeneously directly from the gas phase with the exclusion of any wall reaction and subsequently separated from the reaction medium characterized in that the metal compounds and the coreactants are introduced into the reactor separately from one another at at least the reaction temperature. In the case in which a plurality of metal compounds and/or coreactants are to be introduced, the respective gas mixtures are to be chosen such that during the heating up, no reaction occurs that leads to solid reaction products. The method can be especially advantageously carried out in a tubular reactor. It is especially favourable if the metal compounds, the coreactants and the product particles flow through the reactor in a laminar manner. It is particularly preferred to introduce the metal compounds and the coreactants into the reactor as coaxial laminar substreams. In order, however, to ensure the thorough mixing of the two coaxial substreams, a Karman vortex path with defined intensity and enlargement is produced by installing a disturbance element in the otherwise strictly laminar flow.

A preferred embodiment of the method thus consists in mixing the coaxial, laminar substreams of the metal compound(s) and the coreactants in a defined manner by means of a Karman vortex path.

To prevent the precipitation of the coreactants on the reactor wall, which is highly preferred on energetic grounds, the reaction medium is preferably shielded by an inert gas blanket. This may be carded out by introducing an inert gas stream through specially shaped annular gaps in the reactor wall. Because of the Coanda effect, the inert gas stream lies against the reactor wall. The metal or ceramic powder particles produced in the reactor at typical residence times of between 10 and 300 msec as a result of a homogenous precipitation from the gaseous phase leave the reactor together with the gaseous reactants and the inert gases, which are blown in as carrier gases, purging gases and in order to reduce the HCl adsorption.

The metal or ceramic powder is then preferably separated out at temperatures above the boiling or sublimation points of the metal compounds used, the coreactants and/or the products inevitably formed during the reaction. The separation out, here, may advantageously be carded out by means of a blow-back filter. If the latter is operated at high temperatures of, for example, 600° C., the adsorption of the gases, in particular the non-inert gases such as HCl, $NH_3$, $TiCl_4$, etc., at the very large surface of the ceramic or metal powder may be kept low. In particular, the formation of $NH_4Cl$ (higher than 350° C.) is prevented in the production of nitrides.

The interfering substances that still remain adsorbed on the powder surface, may be further removed in a downstream vacuum vessel, preferably at temperatures of approx. 600° C. again. The finished powder should then be discharged from the apparatus with the exclusion of air.

Preferred metal compounds are one or more from the group comprising $BCl_3$, boric acid esters, boranes, $SiCl_4$, other chlorosilanes, silanes, metal halides, partly hydrogenated metal halides, metal hydrides, metal alcoholates, metal alkyls, metal amides, metal azides, metal borohydrides and metal carbonyls.

Preferred further coreactants are one or more from the group comprising $H_2$, $NH_3$, hydrazine, amine, $CH_4$, other alkanes, alkenes, alkynes, aryls, $O_2$, air, $BCl_3$, boric acid esters, boranes, $SiCl_4$, other chlorosilanes and silanes.

Nano- or microdisperse (crystalline or amorphous) metal and/or ceramic powders can be produced by this method, preferred metal and/or ceramic powders being carbides, nitrides, borides, silicides, phosphites, sulfides, oxides and/or combinations thereof of the elements B, Al, Si, Ti, Zr, Hf, V, Nb, Ta, Cr, Mo, W, La, Y, Fe, Co, Ni or these elements alone or in combination with one another.

It is possible, by this method, to produce metal and ceramic powders having a particle size adjustable between 1 and 3000 nm (3 μm) and extremely narrow particle size distribution. A characteristic of the particles thus produced is the complete absence of particles that are considerably larger than the average grain size. Thus, the powders produced by the method generally comprise less than 1% of individual powders that deviate by more than 20% from the average grain size. No particles that deviate by more than 50% are present.

The non-oxidic powders have extremely low oxygen contents (less than 1000 ppm). Further charactistics of the powders are their high purity, high surface purity and good reproducibility.

In the method according to the present invention it is possible to sinter the metal or ceramic powders completely at extremely low temperatures. The sintering temperature in this case is preferably 0.4 to 0.6 of the melting or decomposition point. This opens up new fields of application for corresponding ceramics. There can also be significant advantages to reduced metal sintering temperature ranges.

To deagglomerate the agglomerates of metal and ceramic starting material in the dispersion medium to their primary particles and to produce a stable nanodisperse suspension, surface modifiers are used according to the invention, i.e. surface-modifying low molecular-weight organic (=carbon-containing) compounds are used which have at least (and preferably) one function group which can react and/or (at least) interact with groups present on the surface of the metal and ceramic particles. Compounds suitable for this are in particular those having a molecular weight which is not higher than 1000, preferably not higher than 500 and in particular not higher than 350. Such compounds are preferably liquid under standard conditions and are soluble, or at least emulsifiable, in the dispersion medium.

Such compounds preferably have no more than a total of 30, in particular no more than a total of 20 and particularly preferably no more than 15, carbon atoms. The functional groups which these compounds have to bear depend primarily on the surface groups of the particular starting material used and, furthermore, on the desired ineraction. It is particularly preferred if an acid/base reaction according to Bronsted or Lewis (including complex formation and adduct formation) can take place between the functional groups of the surface-modified compound and the surface groups of the particles. An example of another suitable interaction is the dipole-dipole interaction. Examples of preferred functional groups are thus carboxylic acid groups (primary, secondary and tertiary) amino groups and C—H acid groupings. A plurality of these groups may also be present in one molecule betaines, amino acids, EDTA, etc.

Accordingly, examples of particularly preferred surface modifiers are saturated or unsaturated mono- and polycarboxylic acids (preferably monocarboxylic acids) with 1 to 12 carbon atoms (e.g. formic acid, acetic acid, propionic acid, butyric acid, pentanoic acid, hexanoic acid, acrylic acid, methacrylic acid, crotonic acid, citric acid, adipic acid, succinic acid, glutaric acid, oxalic acid, maleic acid and fumaric acid). In the case of the unsaturated carboxylic acid, there is also the possibility of carrying out crosslinking with the aid of the ethylenically unsaturated double bond.

Examples of other suitable surface modifiers are mono- and polyamines, in particular those of the general formula $R_{3-n}NH_n$, wherein n=0, 1 or 2 and the R residues, independently of one another, represent alkyl groups having 1 to 12, in particular 1 to 6 and particularly preferably 1 to 4, carbon atoms (e.g. methyl, ethyl, n- and i-propyl and butyl) and ethylene polyamines (e.g. ethylene diamine, diethylene triamine, etc.); β-dicarbonyl compounds having 4 to 12, in particular 5 to 8 carbon atoms, for example acetyl acetone, 2,4-hexane dione, 3,5-heptane dione, acetoacetic acid, and $C_1$–$C_4$-alkyl acetoacetate, organoalkoxy silanes, for example those which are used for the surface modification of colloidal silicic acid (e.g. those of the general formula $R_{4-m}Si(OR')_m$, wherein the groups R and R' independently of one another, represent $C_1$–$C_4$-alkyl and m is 1, 2, 3 or 4) and modified alcoholates in which some of the OR groups (R as defined above) are substituted by inert organic groups and via which bonding (condendation) of the OR groups still present to the particle surface takes place, and the organic groups effect the shieldings. Examples of this are, for example, zirconium and titanium alcoholates $M(OR)_4$ (M=Ti, Zr), in which some of the OR groups have been replaced by a complexing agent, for example a β-dicarbonyl compound or a (mono)carboxylic acid. If an ethylenically unsaturated compound (such as methacrylic acid) is used as complexing agent, crosslinking may additionally take place (see above).

In the case of TiN, particularly preferred surface modifiers are guanidine carbonate and guanidine propionic acid.

Water and/or polar organic solvents are used as dispersion medium. Suitable polar organic solvents are preferably those that are miscible with water. Specific examples of polar organic solvents that can be used are alcohols, for example aliphatic alcohols with 1 to 6 carbon atoms (in particular methanol), ethanol, n-and i-propanol and butanol), ketones, such as acetone and butanone, esters, such as ethyl acetate, ethers, such as diethyl ether, tetrahydrofuran and tetrahydropyran, amides, such as dimethylacetamide and dimethylformamide, sulfoxides and sulfones, such as sulfolane and dimethyl sulfoxide, and halogenated aliphatic hydrocarbons. Naturally, mixtures of these solvents can also be used.

The dispersion medium used preferably has a boiling point which allows its ready removal by distillation (optionally under reduced pressure). Solvents with a boiling point below 200° C., in particular below 150° C., are preferred.

In the implementation of the method according to the invention, the content of dispersion medium is generally 20 to 90, preferably 30 to 80, and in particular 35 to 75 wt.-%. The remainder of the dispersion is composed of ceramic or metal starting powder and low-molecular-weight organic compounds (surface modifiers). The weight ratio of ceramic or metal starting powder/surface modifier is in this case generally 1000:1 to 4:1, in particular 500:1 to 8:1 and particularly preferably 250:1 to 10:1.

The method according to the invention is preferably carried out at a temperature of from room temperature (approx. 20° C.) up to the boiling point of the dispersion medium. Dispersion temperatures are preferably in the range from 50° to 100° C. In a particularly preferred embodiment, refluxing of the dispersion medium is employed.

The dispersion time depends in particular on the type of materials used, but is generally some minutes up to several hours, for example 1 to 24 hours.

To improve the deagglomeration, the dispersion (suspension) may optionally be treated by means of ultrasound, intensive mixers or in grinding processes conventional for ceramics, e.g. agitating ball mills.

After completion of the surface modification, the dispersion (suspension) obtained may be either further processed as such (i.e. for the production of green bodies or for coating substrates) or the dispersion medium is entirely or partly removed (for example until a desired solids concentration is reached) before further processing. A particularly preferred method for removing the dispersion medium is freeze drying or freeze spray drying.

After drying, the surface-modified metal or ceramic powder may optionally be redispersed in a different dispersion medium, which comprises water and/or an organic solvent. For complete redispersion, it has proved appropriate first of all to modify the powder with the surface modifier and then to redisperse it in an organic solvent, a mixture of organic solvent and water or else pure water.

The metal or ceramic suspensions obtained by the method according to the invention or the dry, surface-modified nanocrystalline metal or ceramic powders have a particle size distribution of below 100 nm. They can be further processed in various ways to produce green bodies or sintered bodies or coatings. For example, extrusion compounds can be produced, which, after extrusion, can be sintered to produce finished molded bodies. In the process, 20 to 80, in particular 30 to 70 and particularly preferably 40 to 60 parts by weight of surface-modified metal or ceramic powder (either as such or in the form of a dispersion produced, for example, as above), 10 to 70, in particular 20 to 60 and particularly preferably 30 to 50, parts by weight of dispersion medium and 0.5 to 20, in particular 2 to 15, particularly preferably 5 to 10, parts by weight of additives, selected from binders, plasticizers and mixtures thereof are usually used per 100 parts by weight of extrusion compound.

The aforementioned binders and plasticizers are preferably selected from modified celluloses (e.g. methylcellulose, ethylcellulose, propylcellulose and carboxymodified cellulose), polyalkylene glycols (in particular polyethylene glycol and polypropylene glycol, preferably with an average molecular weight of 400 to 50 000), dialkylphthalates (e.g. dimethylphthalate, diethylphthalate, dipropylphthalate and dibutylphthalate) and mixtures of the aforesaid substances. Naturally, other binders and plasticizers, such as polyvinylalcohol etc., may also be used.

The aforesaid binders and plasticizers are required to ensure an extrudable compound and an adequate dimensional stability after shaping.

After thorough mixing of the aforesaid components (e.g. in a conventional mixing device), a portion of the dispersion medium can be removed (preferably under reduced pressure), until the extrusion compound has the desired solids content. Preferred solids contents of the extrusion compound are at least 30 and in particular at least 40 vol.-%.

Other preferred shaping methods are electrophoresis, slip casting, slip pressure casting and filter pressing, and also combinations of electrophoresis, slip casting, slip pressure casting or filter pressing; also injection moulding, fibre spinning, gel casting and centrifuging. By means of these shaping processes, compact molded bodies with high green densities are obtained. The suspensions can be used for coating purposes. Suitable coating processes are, for example, dip coating, spin coating, doctor blade application, spreading and electrophoresis. Substrates that come into consideration are, for example, metals, ceramics, hard metals, glass and cermets. The coatings can be applied as single layers or multi-layers.

The green bodies or coatings produced can then be dried and subjected to sinter treatment. In this process it has been found, surprisingly, that the desired compaction takes place even at relatively low temperatures. Furthermore, surprisingly, no sinter additives are required. The sintering temperature is usually in the range from 0.4 to 0.6 of the melting point or decomposition point. This is significantly lower than in the prior art, where temperatures close to the melting point or decomposition point, sintering additives and possibly also pressure are required.

The ceramic and metal sintered bodies or coatings obtained are characterized by a nanoscale structure with a grain size below 100 nm, a density of >95% of the theoretical and a high hardness.

The metal and ceramic sintered molded bodies produced according to the invention are used, for example, as:

bulk ceramic, for example for abrasive powder;

coating material for metals, ceramics and glass for decoration purposes, wear protection, triboligical applications, corrosion protection, in particular as a coating on cutting tools and abrasive agents or abrasive powders;

component in ceramic/ceramic composites. $Al_2O_3$, TiC, SiC and $Si_3N_4$, in particular, come into consideration as matrix phase;

component of nanocomposites;

sintering aids for relatively coarse ceramics;

hard-type metal/ceramics composites;

cermets;

microporous coatings for filtration purposes, e.g. micro-ultra-nano-filtration and reverse osmosis.

DETAILED DESCRIPTION OF PREFERRED EMBODIMENTS

The following examples serve to explain the present invention further without, however, restricting it.

EXAMPLE 1

Surface modification of nanoscale TiN 1 g of guanidine propionic acid was dissolved in 200 ml of a mixture of water and ethanol (volume ratio 1:1). 10 g of TiN powder, which was obtained according to example 2 of the German patent application P 42 14 719.0 (U.S. application Ser. No. 08/050,590) was added to the solution with constant stirring. Subsequently the mixture is heated for 5 hours with refluxing at 100° C. After the end of the reaction time the suspension was separated out and the filter residue was washed with ethanol. The moist powder obtained was dried for 8 h at 70° C.

EXAMPLE 2

Redispersion of the TiN powder and slip formation 60 g of the surface-modified TiN powder from Example 1 was added to 100 ml of water under constant stirring and intermittent ultrasonic treatment. In the process, the pH of the suspension was maintained at a value of approximately 9 by the addition of tetrabutyl ammonium hydroxide. A stable slip with 37.5 wt.-% solids content was produced. The particle size was in the range from 20 to 50 nm.

EXAMPLE 3

The method of Example 2 was repeated, however methanol was used as redispersion medium instead of water.

EXAMPLE 4

The method of Example 2 was repeated, however ethanol was used as redispersion medium instead of water.

EXAMPLE 5

Green body production from the TiN slip (slip casting) 50 ml of the 37.5 wt.-% strength TiN slip from Example 2 was poured into a round PMM mold (diameter: 40 mm, height: 50 mm, pore size 1 μm). After standing for 6 hours, a green body with the dimensions: diamter 40 mm, height 3 mm, green density 40–50% of the theoretical was produced.

EXAMPLE 6

A green body was produced according to Example 5, but additional pressure was applied (5 bar) to reduce the casting time.

EXAMPLE 7

Green body sintering

Green bodies produced according to Example 5 were dried under regulated moisture and temperature in a climatic cabinet. After drying, they were sintered in an argon atmosphere at temperatures between 1100° C. and 1300° C. (i.e . . . to . . . % of TiN melting point. The heating rate is 3 K./min up to T=600° C. and 20 K./min between 600° C. and the isothermal holding temperature. As a result of this sinter treatment, the samples reached relative densities of over 95% of the theoretical and had average grain sizes of below 100 nm.

EXAMPLE 8

Coating of $Al_2O_3$ substrates

Following the method of Example 1, a 20 wt.-% strength aqueous suspension of surface-modified TiN powder was produced. A dense-sintered $Al_2O_3$ plate was coated by immersion in the suspension. The coated plate was dried and sintered at 1300° C. in an argon atmosphere. By this means a solid TiN top coat with a thickness of approx. 5 μm was obtained.

We claim:

1. Method for producing metal and ceramic sintered bodies or coatings comprising:
   (a) nanoscale ceramic or metal powder particles wherein less than 1% of the individual particles have a deviation of more than 40%, and essentially no individual particles have a deviation of more than 60%, from the average grain size, and
   (b) at least one low molecular-weight organic compound having at least one functional group that reacts and/or interacts with groups present on the surface of the powder particles, the materials (a) and (b) being dispersed in water and/or a polar organic solvent as dispersion medium:

the method comprising the further steps of removing the dispersion medium, forming the surface-modified ceramic or metal powder, before or after the removal of the dispersion medium, to a green body or coating and sintering such green body or coating.

2. Method according to claim 1, characterized in that less than 1% of the individual particles have a deviation of more than 20% and no individual particles have a deviation of more than 50% from the average grain size.

3. Method according to either of claims 1 or 2, characterized in that less than 1% of the individual particles have a deviation of more than 10% and no individual particles have a deviation of more than 40% from the average grain size.

4. Method according to either of claims 1 or 2, characterized in that the metal and/or ceramic powders are selected from the group consisting of carbides, nitrides, borides, silicides, phosphites, sulfides, oxides and/or combinations thereof of the elements B, Al, Si, Ti, Zr, Hf, V, Nb, Ta, Cr, Mo, W, La, Y, Fe, Co, Ni alone or in combination with one another.

5. Method according to either of claims 1 or 2, characterized in that fine-particulate powders of the metals selected from the group consisting of Fe, Co, Ni, W and Mo, with a defined particle size between 1.0 nm and less than 100 nm, are used as metal powder.

6. Method according to either of claims 1 or 2, characterized in that fine-particulate powders of the metals selected from the group consisting of B, Al, Si, Ti, Zr, Hf, V, Nb, Ta und Cr, with a defined particle size between 1.0 nm and 3 μm, are used as metal powder.

7. Method according to either of claims 1 or 2, characterized in that fine-particulate non-oxide ceramic powders MeX, wherein Me is selected from the group consisting of B, Al, Si, Ti, Zr, Hf, V, Ta, Nb, Mo, W, La, Fe, Co, Ni and Cr and combinations thereof and X is selected from the group consisting of C, N, B, Si and combinations thereof, with the exception of $Si_3N_4$ larger than 100 mn and AlN larger than 200 nm, are used as ceramic powder.

8. Method according to claim 7, characterized in that the ceramic powders have an oxygen content of less than 5,000 ppm.

9. Method according to claim 8, characterized in that the oxygen content is less than 1,000 ppm.

10. Method according to claim 8, characterized in that the oxygen content is less than 50 ppm.

11. Method according to either of claims 1 or 2 wherein metal powders are used and they have an oxygen content of less than 5,000 ppm.

12. Method according to claim 11, characterized in that the oxygen content is less than 1,000 ppm.

13. Method according to claim 11, characterized in that the oxygen content is less than 50 ppm.

14. Method according to claim 1, characterized in that fine-particulate oxide ceramic powders of metal oxides are used, wherein the metal is selected from the group consisting of Al, Si, Zr, Hf, Ta, Nb, Mo, W, V, La, Y and combinations, the $Al_2O_3$ being present in the α-phase and the $SiO_2$ being present in crystalline form.

15. Method according to claim 7, characterized in that the total of the impurities of the ceramic powders, with the exception of oxidic impurities, is less than 5,000 ppm.

16. Method according to claim 15, characterized in that the total of the impurities, with the exception of the oxidic impurities, is less than 1,000 ppm.

17. Method according to claim 16, characterized in that the total of the impurities, with the exception of the oxidic impurities, is less than 200 ppm.

18. Method according to claim 1, characterized in that the surface-modified metal or ceramic powder is sintered at a temperature which is 0.4 to 0.6 of the melting point or decomposition point.

19. Method according to claim 1, characterized in that the low molecular-weight organic compound has a molecular weight of not more than 1,000, in particular not more than 500.

20. Method according to either of claims 1 or 19, characterized in that the low molecular-weight organic compound is selected from the group consisting of aliphatic compounds; saturated or unsaturated $C_1$–$C_{12}$ monocarboxylic acids, polycarboxylic acids; amines of the formula $R_{3-n}NH_n$, wherein n=0, 1 or 2 and the residue R, independently of one another, represent alkyl groups with 1 to 12 carbon atoms; β-carbonyl compounds with 4 to 12; titanic acid esters; alcoholates and organoalkoxysilanes.

21. Method according to claim 20, wherein R is an AlYl group with 1 to 6 carbon atoms.

22. Method according to claim 20, wherein the dicarbonyl compound has 5 to 8 carbon atoms.

23. Method according to claim 20, characterized in that the dispersion medium comprises a mixture of water and a polar organic solvent.

24. Method according to claim 20, characterized in that 20 to 90, based on the total weight of dispersion medium, ceramic or metal powder and low molecular-weight organic compound, is used.

25. Method according to claim 24, wherein 30 to 80 wt.-% of dispersion medium is used.

26. Method according to claim 20, characterized in that the weight ratio of ceramic or metal powder/low molecular-weight organic compound is 1000:1 to 4:1.

27. Method according to claim 26, wherein the powder/organic compound weight ratio is in the range from 500:1 to 8:1.

28. Method according to claim 1, characterized in that the dispersion is carried out at a temperature of 20° C. up to the boiling point of the dispersion medium.

29. Method according to claim 28, wherein the dispersion medium is refluxed.

30. Method according to claim 1, characterized in that the dispersion medium is removed by freeze drying or freeze spray drying.

31. Method according to claim 1, characterized in that the surface-modified ceramic or metal powder is redispersed in another medium after the separation therefrom of the dispersion medium.

32. Method according to claim 1 characterized in that the ceramic powder particles comprise a compound of Ti.

33. Method according to claim 1 characterized in that the ceramic powder particles comprise TiN.

34. Method according to claim 1 characterized in that the ceramic powder particles comprise TiN/SiC, where TiN is the major component.

35. Method according to claim 1 characterized in that the ceramic powder particles comprise $TiN/Si_3N_4$, where TiN is the major component.

* * * * *